(12) United States Patent
Zhou et al.

(10) Patent No.: US 7,995,516 B2
(45) Date of Patent: Aug. 9, 2011

(54) MOBILE WIRELESS BASE STATION

(75) Inventors: Zhen-Hong Zhou, Bronx, NY (US); Yu Yang, Beijing (CN); Wei Qingxin, Beijing (CN); Weizhou Wang, Beijing (CN); Shi Lei, Beijing (CN)

(73) Assignee: Top Global Technologies Limited, Wayland, MA (US)

( * ) Notice: Subject to any disclaimer, the term of this patent is extended or adjusted under 35 U.S.C. 154(b) by 182 days.

(21) Appl. No.: 10/515,771

(22) PCT Filed: Jun. 30, 2003

(86) PCT No.: PCT/US03/20605
§ 371 (c)(1),
(2), (4) Date: Sep. 1, 2005

(87) PCT Pub. No.: WO2004/070970
PCT Pub. Date: Aug. 19, 2004

(65) Prior Publication Data
US 2006/0098620 A1    May 11, 2006

(30) Foreign Application Priority Data

Jan. 28, 2003 (CN) .................. 03 1 01878

(51) Int. Cl.
*H04W 4/00* (2009.01)
(52) U.S. Cl. ........ 370/328; 370/338; 370/465; 370/331; 455/445; 455/436; 455/437
(58) Field of Classification Search .................. 370/352, 370/328, 338, 465, 331; 455/445, 436–444
See application file for complete search history.

(56) References Cited

U.S. PATENT DOCUMENTS

| 6,424,657 | B1 | 7/2002 | Voit et al. ........................ 370/412 |
| 6,483,852 | B1 | 11/2002 | Jacquet et al. ................. 370/466 |
| 6,546,425 | B1 * | 4/2003 | Hanson et al. ................. 709/227 |
| 6,600,734 | B1 * | 7/2003 | Gernert et al. ................. 370/352 |
| 6,618,162 | B1 | 9/2003 | Wiklof et al. ................. 358/1.15 |
| 7,206,294 | B2 * | 4/2007 | Garahi et al. ................. 370/315 |
| 7,551,590 | B2 * | 6/2009 | Haller et al. ................... 370/338 |
| 2002/0118663 | A1 * | 8/2002 | Dorenbosch et al. ......... 370/338 |
| 2002/0167965 | A1 * | 11/2002 | Beasley et al. ................. 370/465 |
| 2003/0016636 | A1 * | 1/2003 | Tari et al. ....................... 370/328 |
| 2004/0023642 | A1 * | 2/2004 | Tezuka ........................... 455/411 |
| 2004/0103278 | A1 * | 5/2004 | Abhishek et al. ............. 713/160 |

* cited by examiner

*Primary Examiner* — Wayne Cai
*Assistant Examiner* — Chuck Huynh
(74) *Attorney, Agent, or Firm* — Hani Z. Sayed; Rutan & Tucker, LLP

(57) ABSTRACT

A mobile wireless bridge (MWB) (110) is able to bridge traffic in either direction between a wireless LAN (140) and a wireless WAN (130), and support roaming of LAN clients (141-143, 151-153) and of the MWB (110) itself. Through the MWB (110), wired (150) and wireless LAN (140) clients (141-143, 151-153) and users are provided Internet (190) connectivity even if the LAN client (141-143, 151-153) is not otherwise able to access the wireless WAN (120). Preferred MWBs (110) will utilize mobile cellular communication networks 100 as part of a WAN (120, 130) used to obtain access to Internet (190) resources. LAN clients (141-143, 151-153) and users can also access each other through the MWB (110) with the MWB (110) functioning as a hub, switch, gateway, and/or access point. Some MWBs (110) will be adapted to access multiple types of LANs (140, 150) and multiple types of WANs (120, 130).

28 Claims, 7 Drawing Sheets

MOBILE WIRELESS BASE STATION

This application claims the benefit of Chinese national patent application number 03101878.5 titled "The methods and the systems of data communication between different networks" and filed on or about Jan. 28, 2003, incorporated herein by reference in its entirety.

FIELD OF THE INVENTION

This invention relates to communication systems and methods, particularly systems and methods that facilitate communication between different networks.

BACKGROUND OF THE INVENTION

Recently, wireless local area networks (LANs) have been developed as an enhanced replacement for wired LANs. In a wireless LAN a plurality of mobile network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802-11 international standard (IEEE 802.11). IEEE 802.11 describes a standard for wireless LAN systems that will operate in the 2.4-2.5 GHz ISM (industrial, scientific and medical) band. This ISM band is available worldwide and allows unlicensed operation for spread spectrum systems. The 2,400-2,483.5 MHz band has been allocated for both the US and Europe. The IEEE 802.11 standard focuses on the MAC (medium access control) and PHY (physical layer) protocols for access point based networks and ad-hoc networks.

In access point based wireless networks, the stations within a group or cell can communicate only directly to the access point. This access point forwards messages to the destination station within the same cell or through the wired distribution system to another access point, from which such messages arrive finally at the destination station.

The 802.11 standard supports three PHY protocols: DSSS (direct sequence spread spectrum), FHSS (frequency hopping spread spectrum), and infrared with PPM (pulse position modulation). All these three PHYs all provide bit rates of 1 and 2 Mbit/s. Furthermore, IEEE 802.11 includes extensions 11a, 11b, and 11g which allow for additional higher bit rates: Extension 11b provides bit rates 5.5 and 11 Mbit/s as well as the basic DSSS bit rates of 1 and 2 Mbit/s within the same 2.4-2.5 GHz ISM band. Extension 11a provides a high bit rate OFDM (Orthogonal Frequency Division Multiplexing modulation) PHY standard providing bit rates in the range of 6 to 54 Mbit/s in the 5 GHz band. Extension 11g provides a high bit rates up to 54 Mbit/s using OFDM in the 2.4-2.5 GHz ISM band.

The IEEE 802.11 basic MAC protocol allows interoperability between compatible PHYs through the use of the CSMA/CA (carrier sense multiple access with collision avoidance) protocol and a random back-off time following a busy medium condition. The IEEE 802.11 CSMA/CA protocol is designed to reduce the collision probability between multiple stations accessing the medium at the same time. Therefore, a random back-off arrangement is used to resolve medium contention conflicts. In addition, the IEEE 802.11 MAC protocol defines special functional behavior for fragmentation of packets, medium reservation via RTS/CTS (request-to-send/clear-to-send) polling interaction and point coordination (for time-bounded services).

Moreover, the IEEE 802.11 MAC protocol defines Beacon frames sent at regular intervals by the access point to allow stations to monitor the presence of the access point. The IEEE 802.11 MAC protocol also gives a set of management frames including Probe Request frames which are sent by a station and are followed by Probe-Response frames sent by an available access point, to allow a station to scan actively if there is an access point operating on a certain channel frequency and to show to the station what parameter settings this access point is using.

Wireless personal digital assistants (WPDA) and "smart" cellular telephones are the most popular devices known to provide "mobile Internet" access for the mass consumer market.

SUMMARY OF THE INVENTION

The present invention is directed to the use of a mobile wireless bridge (MWB) to provide wired and wireless local area network (LAN) clients jointly hereinafter simply "LAN clients") uninterrupted wide area network (WAN) access to Internet resources even if a WAN initially used to access such resources becomes unavailable. A mobile wireless bridge, as the term is used herein, is a device that is adapted to act as a bridge at least between a wireless LAN, a wireless WAN and one other WAN, and preferably is adapted to act as a bridge at least between a wired LAN, a wireless LAN, a wired LAN, and a wireless LAN. Moreover, such a MWB is adapted to interface with a variety of WANs and to seamlessly switch between WANs if a WAN being used becomes unavailable, unreliable, or otherwise undesirable. MWBs will generally also comprise at least one Access Controller that controls LAN client access to any WAN the MWB has access to.

In preferred embodiments MWBs will be adapted couple LANs to Internet resources via a hardwired connection (e.g. cable modem, DSL, T1, etc.) and at least one mobile cellular communications network (MCCN) such that computers or other devices that are not equipped to directly access the MCCN can access Internet resources via the MCCN.

In preferred embodiments MWBs will function as a LAN access point even if the bridge is currently not coupled to any WANs, provide LAN clients access to a wired WAN whenever the MWB has reliable access to any such wired WAN, provide LAN clients access to a wireless WAN whenever any such wired WAN becomes unavailable, and maintain wireless WAN access despite movement of the MWB to different geographic locations.

The use of MWBs eliminates the need for LAN clients to include the hardware and software required to directly access a wired or wireless WAN. When a LAN client needs to access a WAN it uses its (the client's) LAN access and a MWB that is part of the LAN to access a wired or wireless WAN. Since the LAN client does not access the WAN directly, it has no need to support the hardware and/or software necessary for direct WAN access.

The use of multiple MWBs can provide continuous LAN access for LAN clients even if the LAN client moves out of the range of any particular MWB. As such, the use of multiple MWBs allows LAN clients to roam between LANs such bridges are part of.

MWBs can also provide a simple method of providing WAN access to LAN clients in areas where wired WANs are impractical. By placing MWBs in vehicles, LAN clients can have LAN access, WAN access, and Internet access even when the LAN client is out of range of fixed position LAN access points, and does not have access to a wired WAN.

Various objects, features, aspects and advantages of the present invention will become more apparent from the following detailed description of preferred embodiments of the invention, along with the accompanying drawings in which like numerals represent like components.

DETAILED DESCRIPTION

Figure 1A:
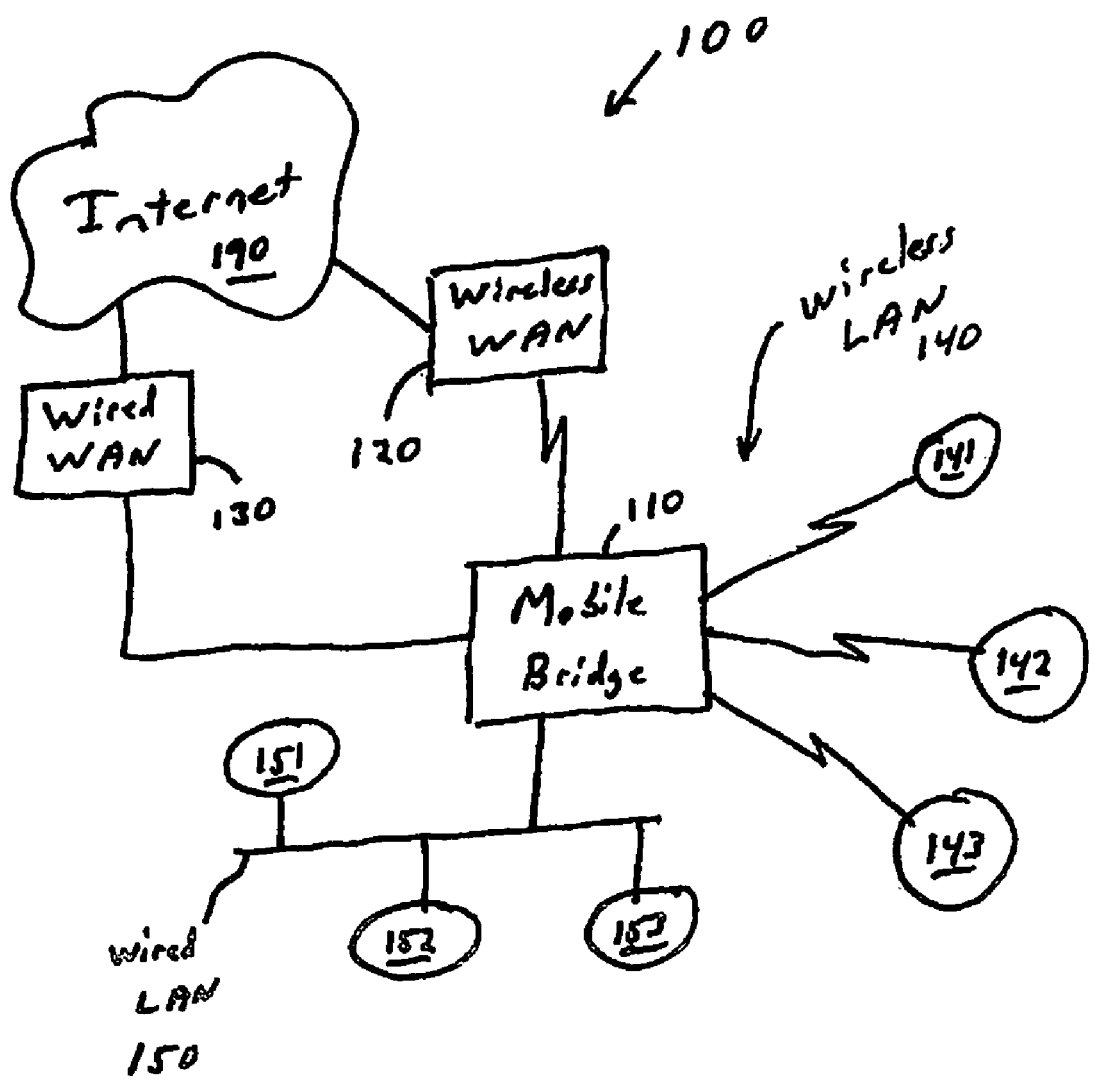
FIG. 1A illustrates a network in accordance with the claimed invention.

FIG. 1A illustrates a network 100 comprising a MWB 110, coupling wireless WAN 120, wired WAN 130, wireless LAN 140, and wired LAN 150. MWB 110 acts as the access point for wireless LAN 140. LANs 140 and 150 include LAN clients 141-143 and 151-153. WANs 110 and 120 are also coupled to the Internet 190 such that any LAN client (141-143, 151-153) obtaining access to WAN 110 or 120 also has access to Internet 190 via WAN 110 or 120. As such LAN clients are able to access Internet resources via MWB 110 and wired WAN 110 and/or wireless WAN 120. In less preferred embodiments, MWB 110 be adapted to couple LANs to wireless WANs but not to wired LANs, and/or may be adapted to only couple wireless LANs to wireless WANs.

LAN clients are devices adapted to be coupled to a LAN, while LAN users are people or other entities that use such LAN clients. The terms "user" and "client" are to a large degree interchangeable as all LAN users will utilize a LAN client. Examples of LAN clients include computers (mainframe, workstation, desktop, laptop, notebook, etc.), personal data assistants (PDAs), and mobile telephones among others.

Figure 1B:
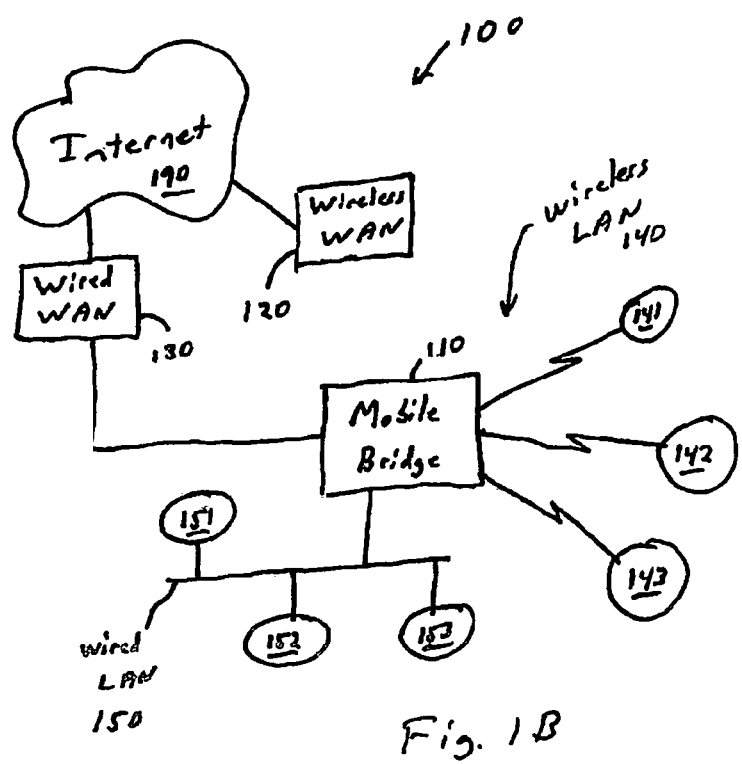
FIG. 1B illustrates the network of FIG. 1A where the MWB is accessing only one of two WANs.
Figure 1C:
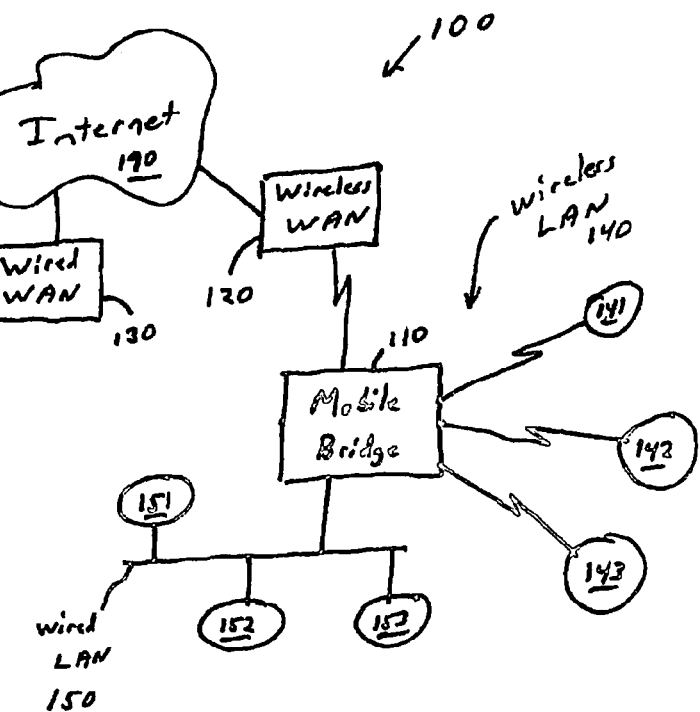
FIG. 1C illustrates the network of FIG. 1A where the MWB is accessing only one of two WANs.

In preferred embodiments MWB 110 will provide WAN access to LAN clients through the use of a wired WAN such as WAN 110 whenever a wired WAN is available as illustrated by FIG. 1B. If such a wired WAN is not available, or becomes unavailable (possibly due to disconnection, failure, unreliability, and/or remoteness), MWB 110 will utilize a wireless WAN such as WAN 120 to provide WAN/Internet access to LAN clients as illustrated in FIG. 1C.

If a switch is made from a first WAN to a second WAN the transition will be made in such a manner that it has minimal impact if any on any LAN clients that are or will be accessing Internet resources. Giving priority to any available wired WAN will decrease the load on wireless WANs and potentially may provide higher data rates and increased reliability to LAN client access of Internet resources while being able to fall back to a wireless LAN helps insure that access to such resources continues even when a wired WAN is unavailable.

In addition to providing continued communication despite loss of access to a wired WAN, MWB 110 may be utilized in situations where wired WANs are unavailable or impractical. One example would be the use of MWB 110 to provided WAN access to LAN clients located in remote locations. Another example would be to use MWB 110 to provide WAN access to clients in regions that are highly developed but have not been wired to provide WAN access. Yet another example would be to provide WAN access to LAN clients on vehicles. By installing a MWB 110 on a vehicle, LAN clients on the vehicle would be able to obtain WAN/Internet via a wireless (and/or in some instances wired) LAN.

In some instances it may be desirable to provide LAN clients with simultaneous access to both wired and wireless WANs as illustrated in FIG. 1A. This may be done for numerous reasons such as load balancing or because certain LAN clients are not allowed to access certain WANs.

Before providing access to a particular WAN, MWB 110 will authenticate any LAN client trying to obtain such access. Such authentication may be done at any time prior to providing a LAN client WAN access, possibly when a LAN client first accesses MWB 110, and/or when a LAN client first attempts to access a particular WAN.

In some instances it will be advantageous to connect multiple MWBs together. Such interconnection of MWBs may be accomplished in any reasonable fashion such as through wired and/or wireless dedicated and/or shared communication lines, and/or wireless distribution system (WDS) technology. Interconnecting MWBs will facilitate roaming of LAN clients in an area of coverage that is larger than can be provided by a single MWB. In the case of wireless LAN clients, it is preferred that transitions from one MWB to another be accomplished as seamlessly as possible so as to provide the LAN clients with uninterrupted access to WAN/Internet resources.

Figure 2A:
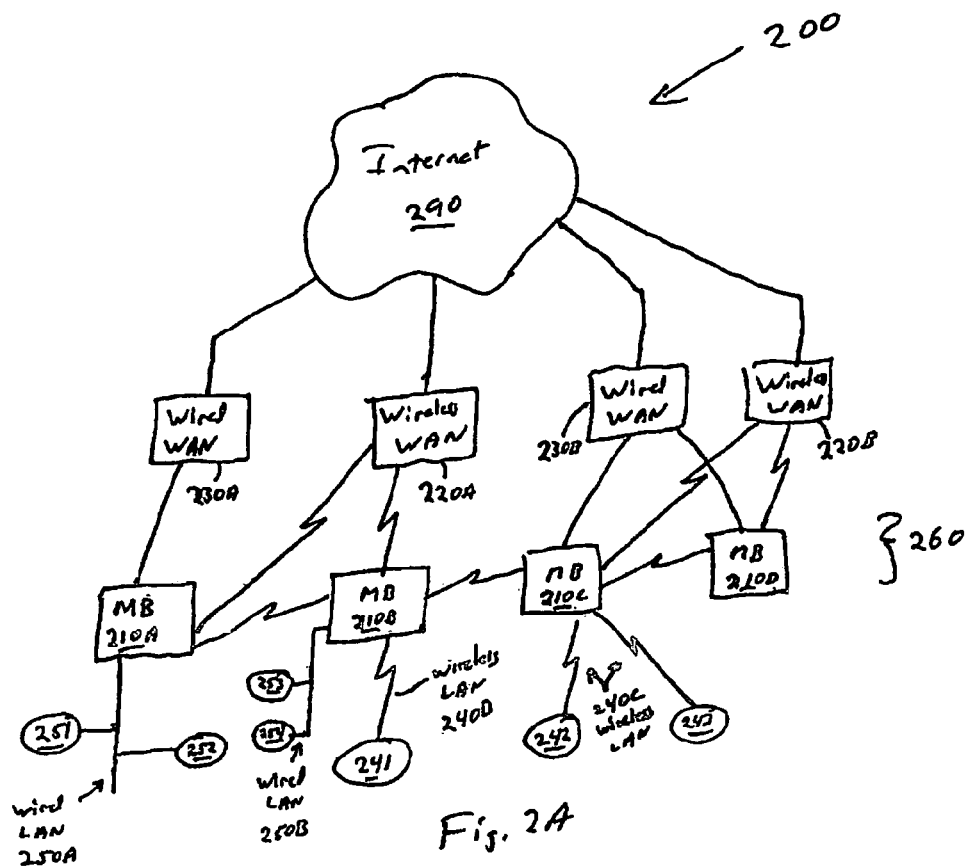
FIG. 2A illustrates a network comprising a plurality of MWBs in accordance with the claimed invention.
Figure 2B:
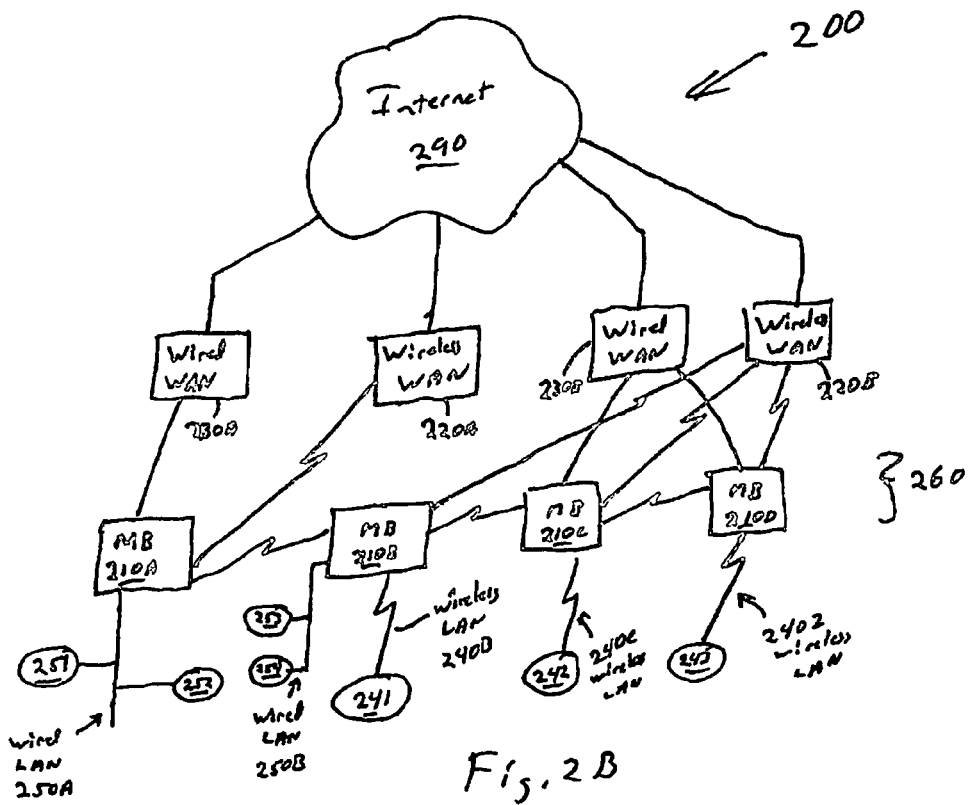
FIG. 2B illustrates the network of FIG. 2A after a LAN client and a MWB have changed position.

In FIG. 2A a network 200 comprises MWBs 210A-210D interconnected by WDS 260, where MWBs 210A-210D in conjunction with wired WANs 230A and 230B, wireless WANs 220A and 220B, wired LANs 250A and 250B, wireless LANS 240B-240D provide access to the Internet 290 to LAN clients 251-254 and 241-243 in the manner previously described in relation to network 100 of FIG. 1. In FIG. 2A, client 243 is at a first location and coupled to MWB 210C via wireless LAN 240C. In FIG. 2B, client 243 is at a different location and coupled to MWB 210D via wireless LAN 240D. In preferred embodiments, the switch from MWB 210C to MWB 210D would be accomplished without any interruption of service to LAN client 243. Similarly, in FIG. 2A a vehicle mounted MWB 210B is at a first location and coupled via wireless WAN 220A to Internet 290 while in FIG. 2B MWB 210B is coupled to Internet 290 via wireless WAN 220B.

When MWBs are interconnected with each other (and possible with other devices that provide related functions) that they MWBs cooperate to best meet the needs of any LAN clients using such MWBs. As such, MWBs may hand off LAN clients to other MWBs if another MWB is better suited to satisfy the needs of the client. Alternatively, MWBs may route LAN client communications between themselves to provide the LAN clients with optimum service. In some instances routing between MWBs may be done to provide LAN clients of a first MWB with higher speed Internet access available to a second MWB.

In instances where a first MWB can connect with at least one other MWB or access point through a WDS, it is preferred that if the MWB detects that any such other MWB or access point has access to a WAN having a higher bandwidth than any WAN the first MWB is currently connected to that the first MWB cooperate with the other MWB or access point to share the higher bandwidth of that WAN. If routing communications to another MWB which becomes unavailable, a MWB should either reroute or directly handle such communications such that a LAN client does not suffer an unacceptable loss of service.

Figure 3:
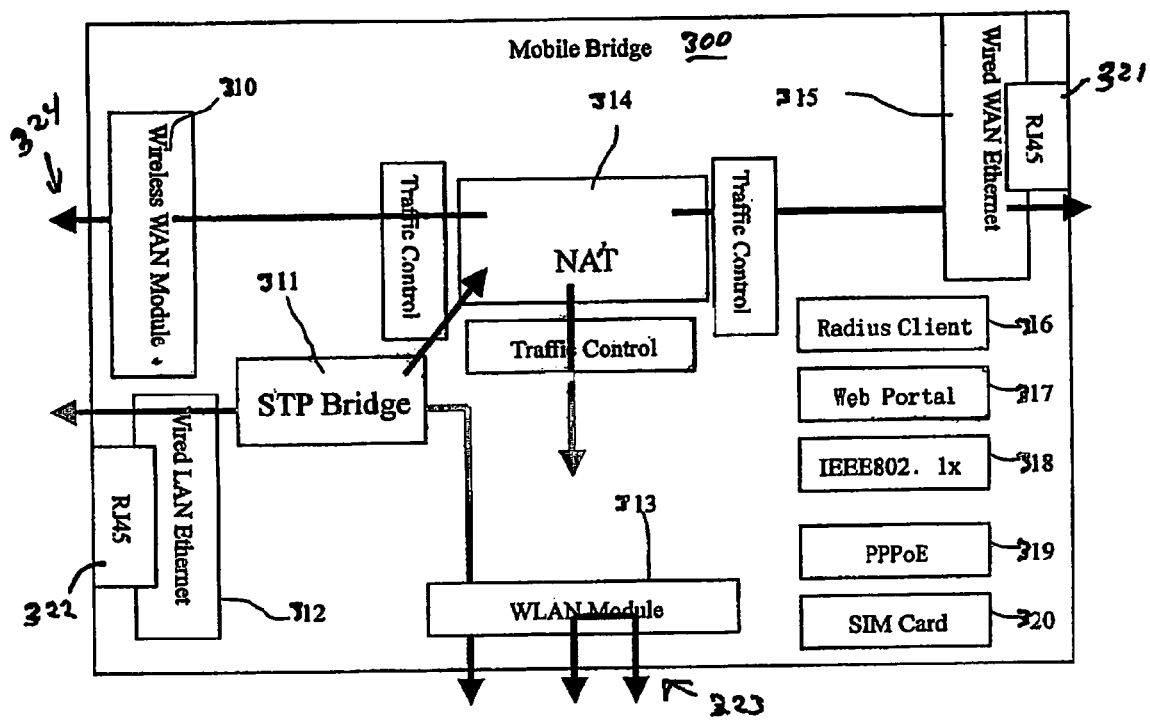
FIG. 3 illustrates the hardware and software modules of a MWB in accordance with the claimed invention.

MWBs such as MWB 110 of FIGS. 1A-1C and MWBs 210A-210D of FIGS. 2A and 2B will preferably comprise at least the following hardware and software modules as illustrated in FIG. 3 in regard to MWB 300:

1. Wireless LAN (WLAN module 313, which is compatible with IEEE 802.11a/b/g standards, and can be used to construct wireless LAN basic service set (BSS) and wireless distribution system (WDS), implement wireless access functions to provide wireless access to LAN clients.

2. LAN Ethernet Controller 312, through which the LAN system domain can be expanded, and through which other wired or wireless LAN systems can be interconnected;

3. WAN Ethernet Controller 315, through which the LAN clients in wired and wireless LANs can access wired WANs and Internet resources.

4. Wireless WAN (WWAN) module 310, which can be a GPRS module, CDMA1X module, any 3G module, or any other type of module that provides access to a particular type of WAN system that is to be accessed by LAN clients using MWB 300. As an example, if LAN clients are to access Internet resource through a GPRS network system, this WWAN module must be a GPRS module.

5. Spanning Tree Protocol (STP) bridge software module 311, which is responsible for data packets forwarding between different LAN (wired and wireless LAN).

6. Network Address Translation and Network Address Port Translation (NAT/NAPT) software module 314, which is responsible for data packet forwarding between LAN and WAN networks.

7. Authentication, Authorization and Accounting software modules:

a) Radius Client module 316, which is used in conjunction with a Radius Server for authentication, authorization and accounting of wired an/or wireless LAN clients and/or their users. This module will preferably be used with one of following authentication methods.

b) Web Portal module 317, which is a simple and practical authentication method, and is used in the most authentication application.

c) IEEE 802.1X module 318, which is another authentication method, and is often used in wireless LAN user authentication. This authentication method is defined in the newest WLAN security standard.

d) PPPoE module 319, which is a set of communication technology, and consist of authentication method, security and some other components usually used in PPP communication and Ethernet applications. In this patent description, its authentication method is mainly used.

e) SIM Card module 320, which is responsible for authenticating MWB 300 as a mobile client in WWAN network system;

8. The MWB has 4 network interfaces: the LAN and WAN Ethernet controllers 312 and 315 connect to a wired LAN and a wired WAN through 2 standard RJ45 interfaces 321 and 322; the wireless LAN module 313 communicates with the WLAN BSS and WDS through IEEE802.11a/b/g radio interface 323; the wireless WAN module 310 acts as a mobile station in WWAN systems (GPRS, CDMA1X and 3G), and connects the WWAN systems through corresponding air radio interfaces 324.

In addition to providing LAN clients access to WANs for data communications, MWBs may be equipped with modules that support voice, video, and other types of communications as well.

Less preferred embodiments may use less than all of the hardware and software modules described above, may use modules not listed, and/or may use additional numbers of at least some of the described modules. In some embodiments modules listed as hardware modules may take the form of software modules and similarly software modules may take the form of hardware modules. Some embodiments may be limited by the modules they contain to accessing only a limited number of different types of LANs and WANs while other embodiments may be more adaptable and able to access all major types of LANs and/or WANs. Standards described may change as newer standards are adopted such that MWBs will continue to be used despite such standard changes.

Figure 4A:
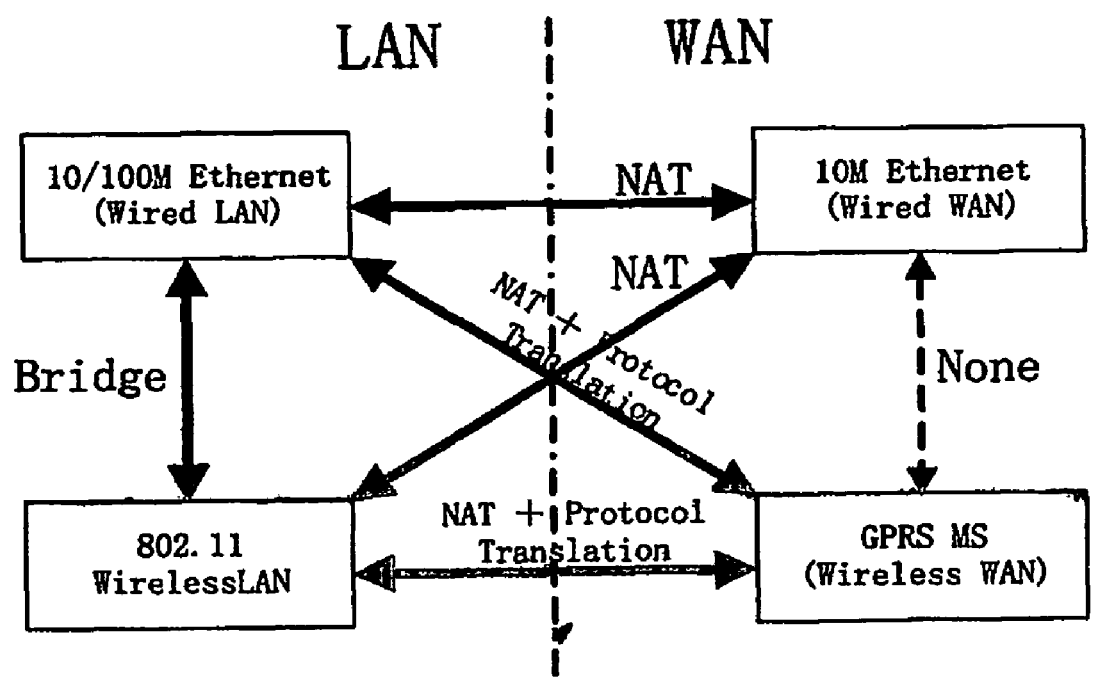
FIG. 4A is a diagram illustrating how data packet streams are transmitted and forwarded by a MWB between different network systems in accordance with the claimed invention.

FIG. 4A illustrates the flow of data packets between different network modules. Packets can flow between any of two of the wired WAN, wireless WAN, wired LAN, and wireless LAN modules except that the MWB is preferred not to support packet flow directly between the wired and wireless WAN modules. When LAN clients access WANs, network address translation and possible protocol translation is performed. Since a MWB is preferred to access as an access point in a wireless LAN, some packets from wireless LAN clients may be intended for other wireless LAN clients. In such instances the wireless LAN module is preferred to route such packets without passing them on to the other modules. When LAN clients want to access the Internet packets will preferably be routed to the wired WAN module if a wired WAN is available, but will otherwise be routed to the wireless WAN module Data packets passing from LAN to WAN modules will preferably first be checked for the data packets source and destination port at the spanning tree bridge module which will then send the data packets to NAT/NAPT module to complete packets network address translation, which will then send them to the wired or wireless WAN module. These steps will be performed in reverse for packets received by a WAN module and headed for a LAN module.

When LAN users access Internet resource, it is an important function to control all of user's access traffic. After LAN users pass the authentication and get access authorization, a MWB can collect user's traffic stream data, and limit the usage of data communication bandwidth by every users according to some predefined rules or subscription information. User's data traffic control can be implemented at the 2nd network layer in the STP bridge module and also can be implemented at the 3rd network layer in the NAT route module. The traffic control implementation is based on the theory that outbound data rate should be controlled by the network interface. Because a MWB must control the data traffic from wired or wireless LAN to wired or wireless WAN network system, the users traffic control is preferably implemented at the 3rd layer based on the NAT/NAPT module.

User traffic control is preferably implemented through the use of queues. For a MWB, we can view the LAN Ethernet controller and wireless LAN modules together as being a downlink port, and the WAN Ethernet controller and wireless WAN modules together as an uplink port. Traffic control, as it is used herein, means that the device interfaces should be controlled to limit data send rate. If the uplink data rate should be controlled, the data rate to uplink port must be controlled and limited. If the downlink data rate should be controlled, the data rate to the downlink port must be controlled and limited. Traffic control in a MWB can be implemented at least 2 stages of data transmission: (1) before data packets queue or (2) after data packets queue. Implementing traffic control on queued packets rather than on incoming packets requires the use of larger queues (i.e. more memory) to avoid the overflow of the queues. Moreover, doing so wastes resources such as CPU process time used to queue packets that are subsequently thrown out. As such, it is preferable to implement traffic control before packets are queued.

Figure 4B:
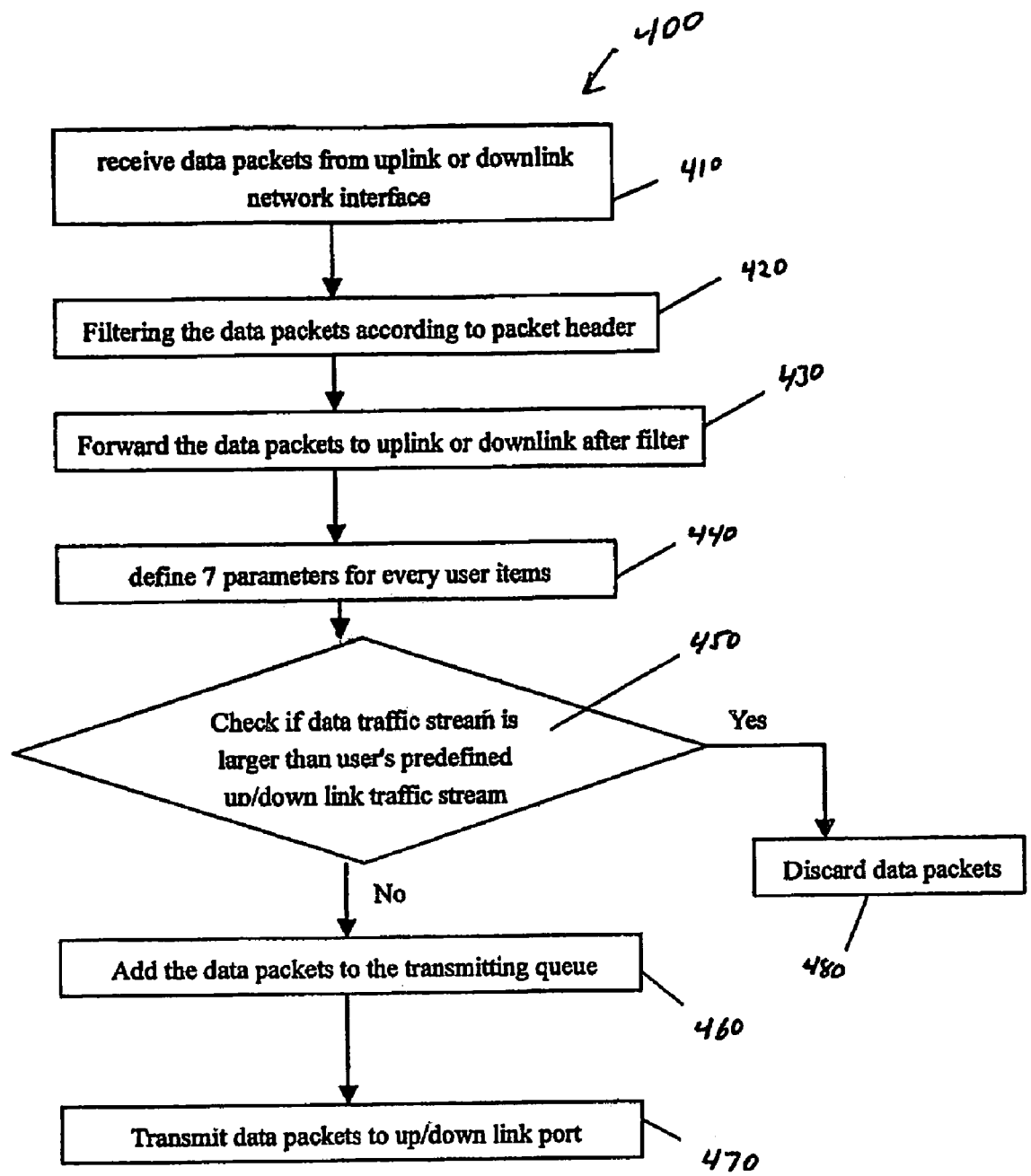
FIG. 4B is a flow chart illustrating the steps by which wired or wireless LAN users are authenticated in wired WAN and wireless WAN systems in accordance with the claimed invention.

Referring to FIG. 4B, the flowchart shown illustrates method 400 by which data packets received by a MWB are controlled and forwarded when LAN clients access a WAN/Internet system resource. In step 410, the Net Address Translation module receives packet from an uplink or downlink. In step 420, the Net Address Translation module filters the packet received according to the header of the packet. Illegal packets will be abandoned and legal packets will be transferred in the uplink or downlink of step 430. Before a packet enters into the queue to wait to be transferred, seven parameters will be, in step 440, set for every LAN client where the seven parameters include: i. MAC address of client (macAddr); ii. Up link rate of client (upRate); iii. Down link rate of client (downRate); iv. Bytes transmitted by the client in the current period (upCount); v. Bytes received by the client in the current period (downCount); vi. Total bytes transmitted by the client: (upTotal); and vii. Total bytes received by the client (downTotal).

In order to control the traffic of the client, MWB needs to check whether the bytes transmitted/received by the client in the current period (1 second for example) is bigger than the up/down link rate set for this client when the packets from/to this client are going to enter the relative queue. If the bytes transmitted/received by the client in the current period is not bigger than the up/down link rate set for this client, the packet will enter the relative queue to wait to be transmitted/received in step 460. Then in step 470, the packet will be transferred to the appropriate port for uplink or downlink. If the bytes transmitted/received by the client in the current period is bigger than the up/down link rate set for this client, the packet will be abandoned in step 480. The upCount and the downCount values are accumulated according to the transfer of data packets, and at the start point of each period (1 second for example) the upCount and the downCount values are reset to zero.

Figure 5:
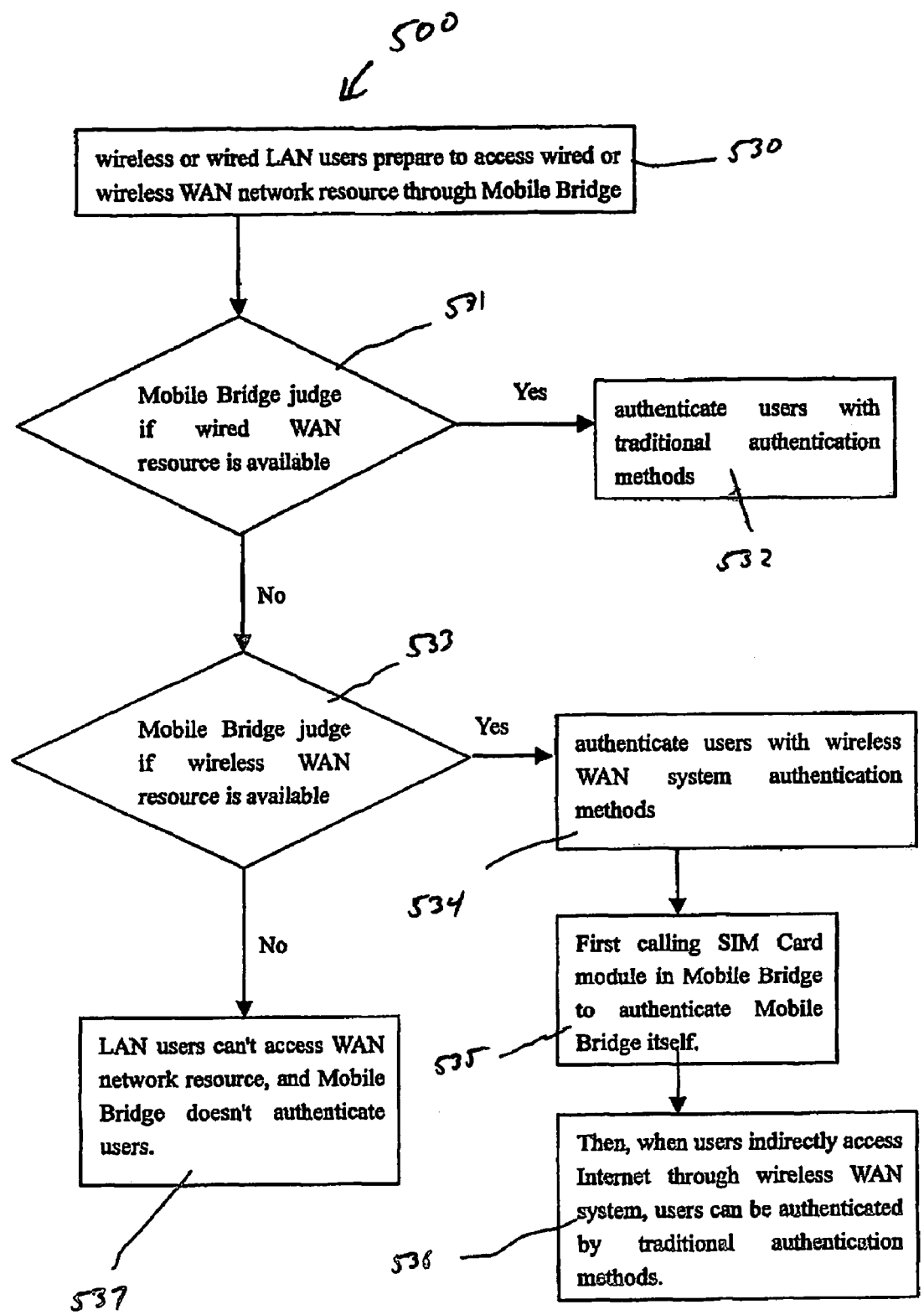
FIG. 5 is a flow chart illustrating the steps by which data packets are controlled and forwarded when wired LAN or wireless LAN users access wired or wireless WAN system resources in accordance with the claimed invention.

Referring to FIG. 5, a preferred method for authenticating LAN clients and/or users is prior to allowing WAN access is illustrated. In the flow chart of FIG. 5 illustrating method 500, the step 530 indicates wireless or wired LAN users prepare to access wired or wireless WAN network resource through a MWB such as bridge 110 of FIG. 1; the step 531 indicates that the MWB will judge if a wired WAN resource is available; the step 532 indicates that, if a wired WAN is available, the MWB will authenticate LAN clients and/or users with traditional authentication methods, which include Web Portal+Radius Client method, IEEE 802.1X or PPPoE+Radius Client methods, etc.; the step 533 indicates that, if the wired WAN system resource is not available, the MWB will judge if a wireless WAN resource is available; the step 534 indicates that, if a wireless WAN resource is available, authentication should be done via wireless WAN system authentication methods. The detailed authentication action in WWAN system is that, as the step 535 describes, the SIM card module in the MWB will first be called on to authenticate the MWB itself as a mobile station in WWAN system, then as the step 536 describes, the LAN clients/users that indirectly access Internet through wireless WAN system can be authenticated by traditional authentication methods via the Internet a described in step 532. On the other hand, if in the step 533 the wireless WAN system resource is not available, the step 537 describes LAN users can't access WAN network resource, and then MWB doesn't authenticate any user or client.

Thus, specific embodiments and applications of network systems comprising MWBs have been disclosed. It should be apparent, however, to those skilled in the art that many more modifications besides those already described are possible without departing from the inventive concepts herein. The inventive subject matter, therefore, is not to be restricted except in the spit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of providing a LAN client access to a WAN resource comprising:

bridging a wireless WAN, a wired WAN, a wireless LAN and a wired LAN with a first mobile wireless bridge;

causing the first mobile wireless bridge to authenticate the identity of said LAN client attempting to access a WAN resource prior to providing access to the WAN resource; and allowing for seamless interfacing between said wired or wireless LAN client and said wired or wireless WAN resource whereby the first mobile wireless bridge is adapted to interface with a variety of WANs and to seamlessly switch between unreliable or undesirable WAN connections due to WAN failure, disconnection, and remoteness;

providing a second mobile wireless bridge interconnected to the first mobile wireless bridge;

bridging a wireless WAN, a wired WAN, a wireless LAN and a wired LAN with the second mobile wireless bridge based on cooperation between the first and second mobile wireless bridges, which interact with each other, such that the first mobile wireless bridge hands off the communication to the second mobile wireless bridge wherein the handoff occurs based on the second wireless bridge being better than the first wireless bridge to satisfy the needs of the client based on a plurality of services being available on the second wireless bridge when both the first and second mobile wireless bridges continue to be within range to communicate with the clients, wherein said plurality of services available includes a higher speed internet access compared to the first mobile wireless bridge and wherein the first mobile wireless bridge and the second mobile wireless bridge cooperate to share the higher bandwidth; and causing the second mobile wireless bridge to authenticate the identity of a LAN client attempting to access a WAN resource prior to providing access to the WAN resource; and allowing for seamless interfacing between said wired or wireless LAN client and said wired or wireless WAN resource whereby at least one of the first or second mobile wireless bridges are adapted to interface with a variety of WANs and to seamlessly switch between unreliable or undesirable WAN connections due to WAN failure, disconnection, and remoteness.

2. The method of claim 1 wherein the first mobile wireless bridge comprises a subscriber identity module that identifies the first mobile wireless bridge to the wireless WAN.

3. The method of claim 1 wherein causing the first and second mobile wireless bridges to authenticate the identity of a LAN client comprises having the client authenticated via the interne through the use of Web Portal, IEEE 802.1x or PPPoE.

4. The method of claim 1 comprising obtaining the following information for the LAN client: (i) MAC address (macAddr); (ii) up link rate (upRate); (iii) down link rate (downRate); (iv) bytes transmitted by the client in the current period (upCount); (v) Bytes received by the client in the current period (downCount); (vi) total bytes transmitted by the client (upTotal); and total bytes received by the client (downTotal).

5. The method of claim 4 wherein:
the first bridge determines whether the bytes transmitted/received by the client in the current period is bigger than an up/down link rate set for this client when the packets from/to this client are going to enter a relative queue; and
if the bytes transmitted/received by the client in the current period is not bigger than the up/down link rate set for this client, the bridge places the packets into the relative queue to wait to be transmitted/received; and
if the bytes transmitted/received by the client in the current period is bigger than the up/down link rate set for this client, the first bridge abandons the packets.

6. The method of claim 4 wherein the upCount and the downCount are accumulated respectively in accordance with the transmission and reception of data packets, and at the start point of each period the upCount and the downCount is set to zero.

7. The method of claim 4 wherein the first wireless bridge supports the transmission of data, voice, and video communication packets between the wireless WAN, wired WAN, wireless LAN and wired LAN.

8. A wireless bridge having an access controller and adapted to function as a bridge between at least one LAN comprising:
a first and a second mobile wireless bridge, the first and second mobile wireless bridges interconnected with each other, and
wherein the first mobile wireless bridge and the second mobile wireless bridge interact with each other to cooperate to determine when the second mobile wireless bridge should establish communications with at least two networks forming a plurality of clients such that the first mobile wireless bridge hands off the communication to the second mobile wireless bridge, and
wherein the handoff occurs based on the second wireless bridge being better than the first wireless bridge to satisfy the needs of the client based on a plurality of services being available on the second wireless bridge when both the first and second mobile wireless bridges continue to be within range to communicate with the clients, wherein said plurality of services available includes a higher speed internet access compared to the first mobile wireless bridge and wherein the first mobile wireless bridge and the second mobile wireless bridge cooperate to share the higher bandwidth; and
at least one WAN whereby at least one of said first and second mobile wireless bridges are adapted to interface with a plurality of WANs and to seamlessly switch between WANs if a WAN being used becomes unavailable due to disconnection, failure of the WAN signal, unreliability of the WAN signal and/or loss of signal, and further whereby the wireless bridge is adapted to couple LANs to internet resources without the need for hardware and software required to directly access a wired or wireless WAN; and
wherein the first mobile wireless bridge and the second mobile wireless bridge authenticating any of the plurality of clients trying to obtain access to the WAN prior to providing WAN access.

9. The bridge of claim 8 comprising at least one wireless WAN module adapted communicate with a wireless WAN and at least one wireless LAN module adapted to communicate with a wireless LAN.

10. The bridge of claim 9 wherein the at least one wireless LAN module is adapted to utilize the IEEE 802.11 protocol.

11. The bridge of claim 9 further comprising a subscriber identity module adapted to provide the bridge access to a wireless WAN.

12. The bridge of claim 9 further comprising at least one wired WAN module adapted to communicate with a wired WAN and at least one wired LAN module adapted to communicate with a wired LAN.

13. The bridge of claim 12 wherein the bridge is adapted to authenticate wired LAN and wireless LAN access.

14. The bridge of claim 13 wherein the bridge is adapted to use IEEE802.1X, Radius Client, Web Portal and or PPPoE in authenticating WAN access.

15. The bridge of claim 12 further comprising a spanning tree module bridging the wireless LAN and wired LAN modules.

16. The bridge of claim 12 further comprising a network address translation module adapted to modify source and or destination addresses of packets passing between the LAN and WAN modules.

17. The bridge of claim 12 wherein each of the wired WAN and wired LAN modules comprises an RJ45 interface.

18. The bridge of claim 17 wherein the wired WAN module further comprises at least an E1/T1 interface and an optical interface.

19. The bridge of claim 9 wherein the wireless WAN module is adapted to use at least one of the following: GPRS, CDMA 1X, CDMA 2000, UMTS, and Satellite.

20. The bridge of claim 19 further comprising additional wireless WAN modules adapted to use at least one of the following GPRS, CDMA 1X, CDMA 2000, UMTS, and Satellite.

21. The bridge of claim 8 wherein the bridge is adapted to function as a bridge between the at least one LAN and at least two WANs wherein the LAN is a wireless LAN, one of the at least two WANs is a wireless WAN, and a second of the at least two WANs is a wired WAN.

22. The bridge of claim 9 wherein the bridge is adapted to communicate with a plurality of wireless bridges through a wireless distribution system.

23. A network comprising two wireless sub-networks coupled together by the wireless bridges of claim 22.

24. The network of claim 23 the two wireless bridges are coupled together via a wireless distribution system.

25. A network comprising two wireless sub-networks coupled together by the wireless bridges of claim 8.

26. The network of claim 25 wherein the two wireless bridges are coupled together via a wireless distribution system.

27. A method of coupling at least two wireless networks together by providing a first mobile wireless bridge adapted to communicate with each of the at least two wireless networks comprising the steps of:
- providing at least one access controller to control the wireless network;
- positioning the mobile wireless bridge in a location where the mobile wireless bridge can communicate with each of the at least two wireless networks to establish a connection when a wireless signal becomes unavailable, unreliable or is lost, and can authenticate connection to the wireless network by any LAN client trying to obtain access,
- causing the first mobile wireless bridge to establish communications with each of the at least two networks and further wherein the first mobile wireless bridge attempts to maintain wireless network access despite the movement of the first mobile wireless bridge to a different geographic location until a handoff occurs; and
- providing a second mobile wireless bridge interconnected with the first mobile wireless bridge, wherein the first mobile wireless bridge and the second mobile wireless bridge interact with each other to cooperate to determine when the second mobile wireless bridge should establish communications with each of the at least two networks such that the first mobile wireless bridge hands off the communication to the second mobile wireless bridge, and
- wherein the handoff occurs based on the second wireless bridge being better than the first wireless bridge to satisfy the needs of the client based on a plurality of services being available on the second wireless bridge when both the first and second mobile wireless bridges continue to be within range to communicate with the clients, wherein said plurality of services available includes a higher speed internet access compared to the first mobile wireless bridge and wherein the first mobile wireless bridge and the second mobile wireless bridge cooperate to share the higher bandwidth.

28. The method of claim 27 wherein causing the first bridge to establish communications with each of the at least two networks comprises providing the first bridge with a subscriber identity module and causing the first bridge to use the subscriber identity module to identify itself to the wireless WAN.

* * * * *